United States Patent
Huang

(10) Patent No.: US 9,998,362 B2
(45) Date of Patent: Jun. 12, 2018

(54) CENTRALIZED DATA PATH ESTABLISHMENT AUGMENTED WITH DISTRIBUTED CONTROL MESSAGING

(71) Applicant: Xieon Networks S.a.r.l., Senningerberg (LU)

(72) Inventor: Kaiyuan Huang, Ottawa (CA)

(73) Assignee: Xieon Networks S.a.r.l., Senningerberg (LU)

( * ) Notice: Subject to any disclaimer, the term of this patent is extended or adjusted under 35 U.S.C. 154(b) by 28 days.

(21) Appl. No.: 15/025,071

(22) PCT Filed: Oct. 11, 2013

(86) PCT No.: PCT/EP2013/071354
§ 371 (c)(1),
(2) Date: Mar. 25, 2016

(87) PCT Pub. No.: WO2015/051856
PCT Pub. Date: Apr. 16, 2015

(65) Prior Publication Data
US 2016/0248664 A1    Aug. 25, 2016

(51) Int. Cl.
*H04L 12/703* (2013.01)
*H04L 12/717* (2013.01)
(Continued)

(52) U.S. Cl.
CPC .............. *H04L 45/28* (2013.01); *H04L 45/42* (2013.01); *H04L 45/44* (2013.01); *H04L 45/62* (2013.01); *H04L 45/64* (2013.01)

(58) Field of Classification Search
None
See application file for complete search history.

(56) References Cited

U.S. PATENT DOCUMENTS 5,649,108 A * 7/1997 Spiegel .................. H04L 45/10
                                                                370/400
7,349,326 B1 * 3/2008 Zadikian ............... H04L 12/437
                                                                370/216

(Continued)

OTHER PUBLICATIONS

Farrel, A., "A Path Computation Element (PCE)-Based Architecture," Old Dog Consulting-J.P. Vasseur, Cisco Systems, et al., rfc4655, pp. 1-41 (2006).

(Continued)

*Primary Examiner* — Candal Elpenord
(74) *Attorney, Agent, or Firm* — Nelson Mullins Riley & Scarborough LLP

(57) ABSTRACT

A communication network has a plurality of network elements (NEs) and links between the NEs. A method includes computing, at a central controller, a data path from the source NE to the destination NE along a number of intermediate NEs, sending, from the central controller, central control messages to all or at least a plurality of NEs among the source NE, the intermediate NEs and the destination NE, the central control messages including explicit path information, the explicit path information in at last some of the central control messages comprising more information than needed by the recipient NE for its set-up for data transport along the path, and sending distributed control messages between NEs of the path, the distributed control messages being based on at least one central control message received by one of the NEs.

26 Claims, 6 Drawing Sheets

Figure 1:
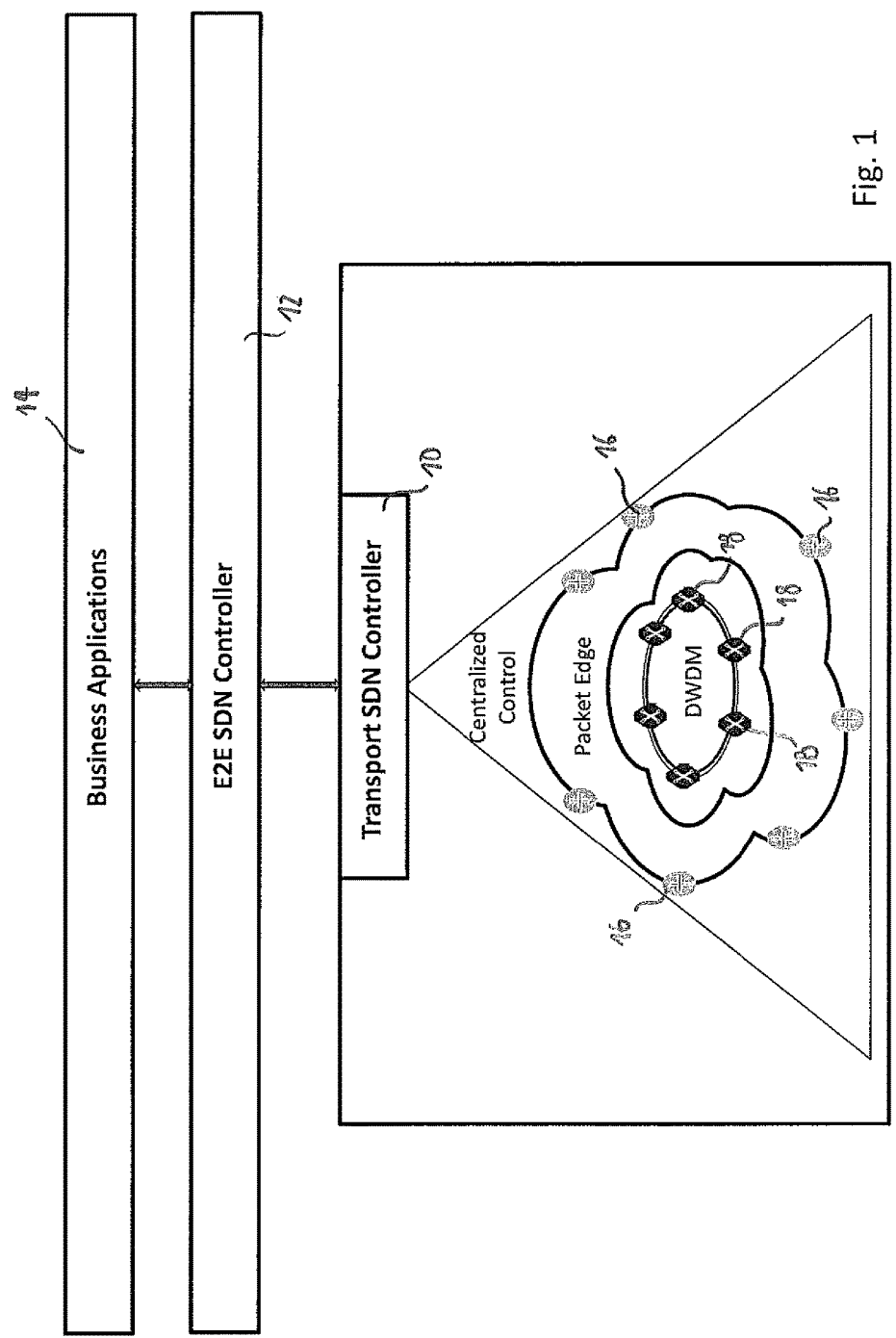

(51) Int. Cl.
*H04L 12/721* (2013.01)
*H04L 12/715* (2013.01)

(56) References Cited

U.S. PATENT DOCUMENTS

| | | | | |
|---|---|---|---|---|
| 7,590,048 B2* | 9/2009 | Doukai | ............... | H04L 45/00 370/217 |
| 7,724,655 B2* | 5/2010 | Saleh | ............... | H04L 45/02 370/228 |
| 7,796,504 B1* | 9/2010 | Owens | ............... | H04L 29/06 370/225 |
| 8,885,463 B1* | 11/2014 | Medved | ............... | H04L 45/50 370/228 |
| 9,185,170 B1* | 11/2015 | Grammel | ............ | H04L 43/0811 |
| 2010/0284269 A1* | 11/2010 | Zhu | ............... | G06F 11/0757 370/221 |
| 2011/0091202 A1 | 4/2011 | Lee et al. | | |

OTHER PUBLICATIONS

International Search Report, PCT/EP2013/071354, dated Jul. 9, 2014, pp. 1-3.

* cited by examiner

CENTRALIZED DATA PATH ESTABLISHMENT AUGMENTED WITH DISTRIBUTED CONTROL MESSAGING

CROSS REFERENCE TO RELATED APPLICATIONS

This application is a 35 U.S.C. 371 national stage filing of International Application No. PCT/EP2013/071354, filed on Oct. 11, 2013. The contents of the aforementioned applications are hereby incorporated by reference in their entireties.

FIELD OF THE INVENTION

The present invention is in the field of communication networks comprising a plurality of network elements and links between said network elements. In particular, the present invention comprises a method of establishing a path for data transport from a source network element to a destination network element as well as a central controller and a network element adapted to operate according to this method.

BACKGROUND OF THE INVENTION

The emergence of optical transport systems has significantly increased the raw capacity of optical networks and has enabled a number of new, sophisticated applications, including network-based storage, bandwidth leasing, data mirroring, add/drop multiplexing (ADM), dense wavelength division multiplexing (DWDM), optical cross-connect (OXC) and multi-service switching platforms.

Managing these types of devices has been a major driving factor in the evolution of multiprotocol label switching (MPLS) towards a Generalized MPLS (GMPLS) suite of protocols to provide control for not only packet-based domains, but also time, wavelength and space domains. GMPLS further extends the suite of IP-based protocols that manage and control the establishment and release of label switched paths (LSP) that traverse any combination of packet, TDM and optical networks. For this purpose, GMPLS introduces new additions to the format of the labels. The new label format is referred to as a "generalized label" that contains information to allow the receiving device to program or "set-up" its switch and forward data regardless of its construction, be it packet, time division multiplexing, lambda switching or the like. A generalized label can represent a single wavelength, a single fiber or a single timeslot. Traditional MPLS labels, for example ATM, VCC or IP Shim are also included.

For allowing establishing of a label-switched path, GMPLS contains two components, a routing protocol that allows the NEs to propagate topology information among themselves, and a signaling protocol that allows the NEs to negotiate among themselves to set up a connection as specified by the route. Herein, the route may be specified only partially, for example only the next hop and the destination. When a route is fully computed and specified, it is referred to as an "explicit route" herein.

As the routing protocol, an OSPF-TE based protocol may be employed. OSPF-TE is an extension of OSPF (open shortest path first), extending the expressivity to allow for traffic engineering (TE) and use in non-IP networks. OSPF-TE allows an NE not only to learn the topology of the network but also to learn the current TE properties such as available bandwidth on a link, and therefore enables it to calculate a route or path satisfying required traffic engineering constraints such as path bandwidth and latency.

For the signaling, a Resource Reservation Protocol-Traffic Engineering (RSVP-TE) based protocol may be used, employing "path messages" that are sent downstream and "reservation messages" that are sent upstream. More particularly, the path message contains a generalized label request, and the downstream node will send back a reservation message (RESV) including a generalized label. In GMPLS-based networks it may happen that part of a path may not be able to be set up as specified by the computed route because the NE resource or link resource for connecting adjacent NEs may be in use for other label switched paths. This can for example happen when the NE where the route is computed does not have the most updated resource allocation information or when a concurrent establishment of other LSPs has taken the required resource before the establishment of the concerned path has taken possession of the required resources. The reason for these problems is that in the OSPF-TE scheme, the NEs where the topology and traffic engineering information is maintained by OSPF can hardly be kept synchronized. This is because the traffic engineering information changes whenever a connection is set up or an existing connection is released. OSPF will need to keep notifying neighbors of such changes, but the more frequent the changes, the more likely it is that the NEs will not be synchronized with regard to traffic engineering information. This means that a route that was computed from outdated traffic engineering data could be invalid. In practice, this could mean that at some intermediate NE, the path set up through signaling fails, in which case the NE "cranks-back" to the NE adjacent in upstream direction of the path which will then try another NE adjacent to it as the next hop and to establish the path further from there.

This situation is known as "signaling crank-back" in RSVP-TE-signaling in GMPLS based networks and may severely slow down the establishment of a path.

SUMMARY OF THE INVENTION

Accordingly, a problem underlying the invention is to provide a method and devices for establishing a path in a communication network that allow to more quickly establish data paths between a source network element and a destination network element while satisfying the required traffic engineering constraints for the path and at the same time provide for a high degree of fault tolerance.

This problem is solved by a method of establishing a path for a data transport from a source NE to a destination NE as defined in claim 1, by a network element according to claim 23. Preferable embodiments are defines in the dependent claims.

The method of the invention comprises the following steps:
  computing, at a central controller, a data path from said source NE to said destination NE along a number of intermediate NEs,
  sending, from said central controller, central control messages to all or at least a plurality of NEs among said source NE, said intermediate NEs and said destination NE, said central control messages including explicit path information, said explicit path information comprising explicit route information and switch set-up information, said explicit path information in at least some of the central control messages comprising more information than needed by the recipient NE for its set-up for data transport along said path, sending distributed control messages between NEs of said path, said distributed control messages being based on at least one central control message received by one of said NEs, said distributed control messages allowing for distributing switch set-up information that was lost due to failure in the transfer of a central control message.

The present invention hence provides a centralized control with explicit route information, in which both central control messages and control messages forwarded in a distributed manner are used in a common scheme to provide a high level of fault tolerance to control path failures.

According to the present invention, a data path from a source NE to a destination NE along a number of intermediate NEs is computed at a central controller. In other words, the central controller represents a centralized path computation element (PCE). Note that in the present disclosure, the term "controller" shall have a broad meaning and generally refers to a computer or a number of computers connected via communication links which is (are) equipped with a suitable software for carrying out the path computation and the respective method steps set forth below in more detail.

This central controller sends "central control messages" to all or at least a plurality of NEs among said source NE, said intermediate NE and said destination NE, where the central control messages include explicit path information. In the present disclosure, "explicit path information" shall comprise explicit route information and switch set-up information. As will be appreciated by the skilled person, the "route information" relates to the identity and order of NEs in the path. The switch set-up information is additional information that an NE may need for its set-up for data transport along the path. "Switch set-up" at a network element means the configuration of the network element to perform some specific switching. In general, a network element may have multiple interfaces, and each interface may have multiple channels. A switch set-up in this context may then mean to set-up the NE in a configuration such that certain data traffic received on some channel X of interface A is directed to channel Y of interface B of the same NE.

Since the data paths are computed by a centralized controller, many problems typical for distributed control schemes like conventional GMPLS-based schemes can be overcome. For example, when all paths in a possibly very large network covering a large geographical area are computed by the same central controller or PCE, the central controller has knowledge of the entire traffic and of all data paths currently established or requested and can hence avoid conflicting paths. Accordingly, problems like "signaling crank-back" and associated issues known from ordinary GMPLS implementations can be avoided, which allows the path to be set up more quickly. Also, since the central controller is aware of the traffic within the network, it is possible for the central controller to always satisfy the required traffic engineering constraints for the path.

Note, however, that the central controller is not only responsible for centrally computing a path, but also for actually controlling the connection set-up by means of a plurality of central control messages that are sent to a plurality of NEs of the path. In other words, while the central controller does in part resemble a centralized PCE, its functionality is way beyond that of an ordinary PCE in that it is actually involved in and responsible for the path set-up control. This is notably different from a scheme in which for example a centralized PCE would be used to calculate the paths, but where the establishment of the path—although based on the centrally computed path information—would still be set up sequentially using RSVP-TE signaling. By using central control messages for connection set-up, however, the central controller may send a plurality of central control messages simultaneously to a plurality of NEs of said path, preferably even to all NEs of said path, so that the connection set-up at the NEs can be carried out simultaneously, thereby reducing the path set-up latency, as opposed to RSVP-TE round-trip signaling in conventional distributed GMPLS applications.

However, using central control messages for the path set-up also has a considerable potential for failure, namely when the control paths between the central controller and one or more of the NEs should fail. A control path failure is the more likely the larger the geographical distance between the central controller and the NEs of the path to be set up is. As will become apparent from the detailed description below, the method of the invention is particularly useful in networks covering large geographical areas, such as in transport networks, where the benefit of quick path set-up and reliably meeting traffic engineering demands is of particular importance. Unfortunately, precisely in these types of networks, no matter where the central controller is located, it will inevitably be located large geographical distances away from at least some of the NEs of the network and one hence has to cope with an inherent risk of control path failures. What is more, if the NE set-up control is carried out by a central control message from the central controller via a control path as is proposed in the present invention, a failure of the control path would normally lead to a failure of the set-up of the path as a whole.

In order to avoid such fault tolerance problems, according to the invention, the explicit path information contained in at least some of the control messages comprises more information than needed by the recipient NE for its set-up for data transport along said path. In other words, the explicit path information included in a central control message may contain switch set-up information for NEs other than the recipient NE, for example for at least half of the NEs or even for all NEs of the data path.

Further, the method comprises a step of sending distributed control messages between NEs of said path, wherein at least some of said distributed control messages are based on at least one central control message received by one of said NEs. In the present disclosure "distributed control messages" are "distributed" in the sense that they are exchanged between NEs of the path rather than between the central controller and an NE. The distributed control messages allow for distributing switch set-up information that was lost due to failure in the transfer of a central control message. Namely, while the natural way to provide the centrally-computed switch set-up information from the central controller to the NEs would be to send to each NE the information it needs for its set-up only, according to the present invention, in at least some of the central control messages, more information is included than needed by the recipient NE for its set-up for data transport, namely also switch set-up information for other NEs. Then, if one of the central control messages should fail to be transferred from the central controller to an NE, the switch set-up information for this NE may still be included in one or more of the control messages that has been sent to another NE, and this switch set-up information can then be communicated to the NE that is "shut-off" from the central controller via the distributed control messages.

Of course, the highest degree of fault tolerance can be achieved if a central control message is in fact sent to each NE, and if each central control message includes the explicit path information of the entire path. However, this high degree of redundancy may not be necessary in practical applications, and the invention encompasses also embodiments where central control messages are not sent to every NE of the path and/or where the central control messages do not include the explicit path information for the entire path, while still leading to a method with sufficient fault tolerance for many applications.

Preferably, the NEs of the path exchange the distributed control messages according to a predetermined scheme or protocol. Many different schemes are possible that would allow for distributing switch set-up information that was lost due to failure in the transfer of central control messages, some of which are discussed in detail below. However, it is understood that many other schemes or protocols would likewise work. Preferably, the scheme ensures—or at least increases the likelihood—that

- each NE, even without a functioning communication path between the NE and the central controller, can receive, from another NE of said path via one of said distributed control messages, the path information relevant for its set-up for data transport along said path, and/or
- it can be determined, by one of said NEs of said path, whether each NE of said path or of a portion of said path
  - has received the explicit path information relevant for setting up said NE for data transport along said path, and/or
  - is available for the requested data transport and/or
  - has successfully been set up for data transport along said path.

Accordingly, the scheme or protocol should be such that each NE should be able to receive the relevant set-up information, from another NE of said path via one of said distributed control messages, even if this NE itself does not possess a functioning communication path with the central controller.

Further, it is advantageous if the scheme or protocol underlying the exchange of said distributed control messages allows determining, by one of the NEs, whether all of said NEs of said path have received the relevant set-up information, are available for the requested data transport and/or have successfully been set up for data transport. Of course, if all central control paths are functioning, all NEs may individually indicate to the central controller that they are "ready and available". However, when one or more NEs are unable to communicate with the central controller, this is no longer possible. Then, according to the above messaging scheme, readiness and availability can be determined by a single one of the NEs, and only this one NE then needs to acknowledge readiness and availability for the entire path, or at least a portion of the path, to the central controller. This allows for significantly increasing the efficiency of the method when at least one of the NEs is unable to exchange messages with the central controller.

Preferably, the explicit route and switch set-up information is included in an Explicit Route Object (ERO) and in Label-Explicit Route Objects (LERO) contained in the central or distributed control messages. Herein, the "labels" have the same meaning as in the generalized multiprotocol label switching (GMPLS) scenario. In particular, the labels may define packet switching; a time slot in a repeating cycle if the network element uses time division multiplexing; a wavelength in a network element involving wave length division multiplexing, i.e. a so-called "lambda switch capable" (LSC) device; or fibers or ports in a "fiber switch capable" (FSC) device. In this regard, the aforementioned "switch set-up information" may be resembled by an explicit label selection.

Preferably, the central control messages comprise "central path messages", wherein said "central path messages" include explicit route and switch set-up information of a continuous portion of the path involving plural adjacent NEs, preferably of the entire path. In other words, the "central path messages" are a specific example of the generic class of "central control messages".

Likewise, the distributed control messages may comprise "distributed path messages" including explicit route and switch set-up information of a continuous portion of the path involving plural adjacent NEs, and preferably of the entire path. In other words, a "distributed path message" is a specific type of the generic "distributed control messages" of the present invention.

In a preferred embodiment, the distributed control messages comprise "distributed acknowledgement messages" including acknowledgement information indicating one or more of the following:

- whether an NE or a group of NEs of said path have received the explicit path information relevant for setting up the respective NE or NEs for data transport along said path,
- whether an NE or a group of NEs of said path is (are) available for the requested data transport,
- whether the NE or a group of NEs of said path has (have) successfully been set up for data transport along said path.

Accordingly, in a preferred embodiment, the method makes use of a second type of "distributed control message" which is referred to as "distributed acknowledgement message". The purpose of the "distributed acknowledgement messages" is to allow checking and communicating in an efficient and reliable manner if the NEs are ready and available for transport of data along the path.

In a preferred embodiment, the distributed path messages are sent along a first direction of the path, and the distributed acknowledgement messages are sent along a second direction of the path. Further, receiving a positive distributed acknowledgement message at an NE from the NE adjacent in the first direction of the path indicates positive acknowledgement information for all NEs in the first direction of said path. With these messaging rules, it can in fact be determined by one of the NEs of the path whether each NE of the path, or portion of said path, has received the necessary information, is available for data transport and/or has successfully been set up for data transport along said path. This will become more apparent from an explicit example described below.

In a preferred embodiment, each NE of said path sends, upon one of

- receiving a central path message from said central controller, or
- receiving a distributed path message from the NE adjacent in the second direction of said path, a distributed path message to the NE adjacent in the first direction of said path. Accordingly, each NE of the path that receives explicit path information via a central path message or a distributed path message forwards all or part of the explicit path information in the first direction of the path by means of a further distributed path message. Typically, the NE may in fact receive both, a central path message and a distributed path message, in which case for practical purposes the distributed path message is still sent only once. According to this scheme, the explicit path information is automatically forwarded in the first direction of the path. An NE in the path that has not received explicit path information via a central path message from the central controller, e.g. due to a failure in the transfer thereof, will still be provided with the explicit path information that it needs by means of distributed path messages.

This is one example of the abovementioned scheme which ensures that each NE, even without a functioning communication path between the NE and the central controller, will receive the path information relevant for its set-up for data transport along the path from another NE of said path via one of said distributed control messages.

Preferably, each of said NEs, upon receiving a central path message or a distributed path message, attempts to set up switching local to the NE as specified by the received central or distributed path message and, if the set up was not successful, generates a negative acknowledgement message and sends it to the central controller if the received path message was a central path message received from the central controller and/or sends a negative distributed acknowledgement message to the NE adjacent in the second direction of said path if the received path message was a distributed path message received from the NE adjacent in the second direction of said path.

According to the embodiments described above, the distributed path messages are always sent in the first direction, and the distributed acknowledgement messages are always sent in the second direction. This means that all NEs that are located in the first direction of an NE that has successfully received the explicit path information can also receive the explicit path information via the distributed path messages sent in the second direction. However, if the NE furthest to the second direction (i.e. the source NE if the second direction is the upstream direction and the destination NE if the second direction is the downstream direction) should not be able to receive a central path message from the central controller, it cannot receive the explicit path information via a distributed path message either, because the distributed path messages are always sent in the first direction, and for the NE located furthest to the second direction there is hence no NE available that could send a distributed path message to it. To make sure that the NE located furthest in the second direction or a group of NEs located furthest to the second direction which is (are) not successfully connected with the central controller can receive explicit path information, in a preferred embodiment, the distributed acknowledgement messages also include explicit route and switch set-up information of a continuous portion of the path involving plural adjacent NEs, preferably at least of the entire path located in the second direction from the NE sending the distributed acknowledgement message. This way, the explicit path information can also be communicated via the distributed acknowledgement messages in a direction opposite to the direction of the distributed path messages.

If an NE receives a distributed acknowledgement message including explicit route and switch set-up information and has not received a central path message or a distributed path message yet, the NE attempts to set-up switching local to the NE as specified in the explicit switch set-up information.

In a preferred embodiment, one of the NEs, upon determining that each NE of said path has received the path information relevant for setting up said NE for data transport along said path, and/or is available for the requested data transport and/or has successfully been set up for data transport along said path, sends a path confirmation message to the central controller. The "path confirmation message" is a single message that confirms, to the central controller, that the entire path has been set up successfully. From the central controller's point of view, the path confirmation message has the same information as a complete set of central acknowledgement messages received from all NEs of the path individually. However, even if one or more of the central acknowledgement messages should not get through to the central controller, the central controller needs to wait for a single path confirmation message only to be informed that all NEs of the path are ready and available for the data transport.

Preferably, the path confirmation message is sent from the NE that is furthest to the second direction that has contact with the central controller. Namely, as explained above, the distributed acknowledgement messages are always sent in the second direction of the path, and each positive distributed acknowledgement message not only indicates that the sending NE is ready and available, but that the same is true for all NEs located further to the first direction of the path. It would therefore be generally preferable if the NE that is furthest to the second direction of the path (i.e. the source NE if the second direction is the upstream direction and the destination NE if the second direction is the downstream direction) sends the path confirmation message, because this is the NE that is in the position to actually confirm that all NEs in the path are ready and available. However, it may be that the NE furthest to the second direction of the path does not have contact with the central controller due to a central control channel failure, so that it cannot send the path confirmation message to the central controller. For this reason, according to this embodiment the path confirmation message is always sent from the NE that is furthest to the second direction but that has contact with the general controller.

In particular, the NE furthest to the second direction attempts, upon receiving a distributed acknowledgement message from the NE adjacent in the first direction, to send the path confirmation message to the central controller. Then, in case that the NE furthest to the second direction is not able to communicate the path confirmation message to the central controller, it sends a "path confirmation failure message" to the NE adjacent in the first direction of the path indicating that it has failed to communicate the path confirmation message to the central controller. Each NE, upon receiving the path confirmation failure message from the NE adjacent in the second direction likewise attempts to send a path confirmation message to the central controller and, in case it was not able to communicate the path confirmation message to the central controller, sends a path confirmation failure message to the NE adjacent in the first direction of said path. This way, the path confirmation failure message is forwarded in the first direction of the path until it is received by an NE that does have contact with the central controller.

Herein, the path confirmation message may simply correspond to a distributed acknowledgement message. In other words, no "new type" of message needs to be generated for the confirmation. Instead, whenever the central control message receives a distributed acknowledgement message from one of the NEs, it will interpret this as a confirmation that the entire path has been set-up successfully.

Likewise, the path confirmation failure message could simply correspond to a distributed acknowledgement message. Normally, an NE will receive a distributed acknowledgement message from the NE adjacent in the first direction of the path, while path confirmation failure messages are received from an NE adjacent in the second direction of the path. Accordingly, if an NE receives a distributed acknowledgement message from an NE adjacent in the second direction of the path, it can interpret this as a path confirmation failure message, so that in this case, too, no new type of message needs to be created.

While the above disclosure is related to the path set-up procedure, the method of the invention also considers the opposite, namely a procedure to release an existing path. Accordingly, preferably the method further comprises a step of releasing a path, comprising:

sending, from said central controller, central path release messages to all or at least a plurality of NEs among said source NE, said intermediate NEs and said destination NE, said central path release messages comprising instructions to release the path, and sending distributed path release messages between NEs of said path, said distributed path release messages being based on at least one central path release message received by one of said NEs, said distributed path release messages allowing for distributing path release information that was lost due to failure in the transfer of a central path release message.

Accordingly, the path release is analogous to the path set-up described before. The central controller can send central path release messages to every NE. In the normal case, i.e. without control path failures, each NE then simply takes down the local switching set-up and releases the local resource for the path and may then send an acknowledgement back to the central controller. However, in case there is a problem with the control path between the central controller and one of the NEs, path release instructions can also be forwarded to an NE using distributed path release messages in an analogous way as the distributed path messages employed in establishing the path.

For carrying out the calculation of a data path, the central controller needs to know the network topology information. Accordingly, in a preferred embodiment, the network elements carry out a discovery of directly or indirectly linked neighbors and forward neighbor adjacency information to the central controller. For this purpose, for example the link management protocol (LMP) or equivalent means can be employed.

In a preferred embodiment, the central controller carries out a path calculation in a multi-layer architecture comprising IP routing and optical switching.

Preferably, the central controller is an SDN controller managing data flow controlling the network.

SHORT DESCRIPTION OF THE FIGURES

Figure 2:
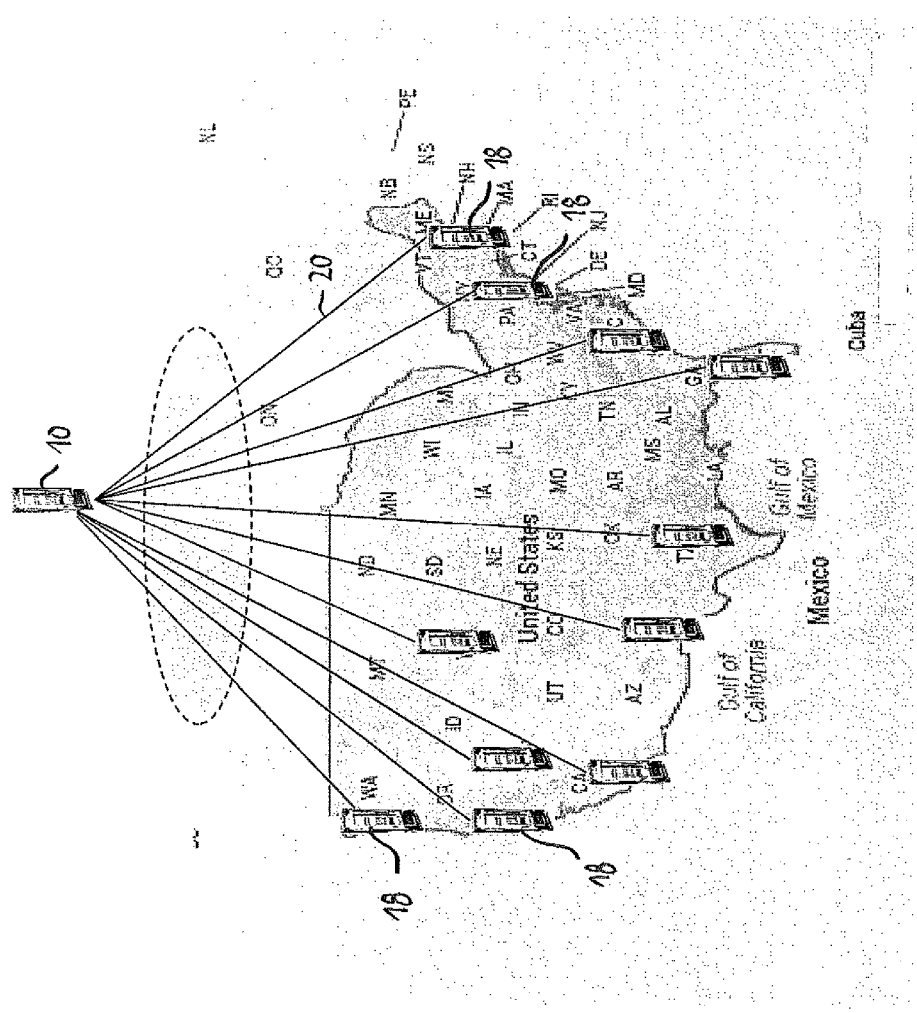
Figure 3:
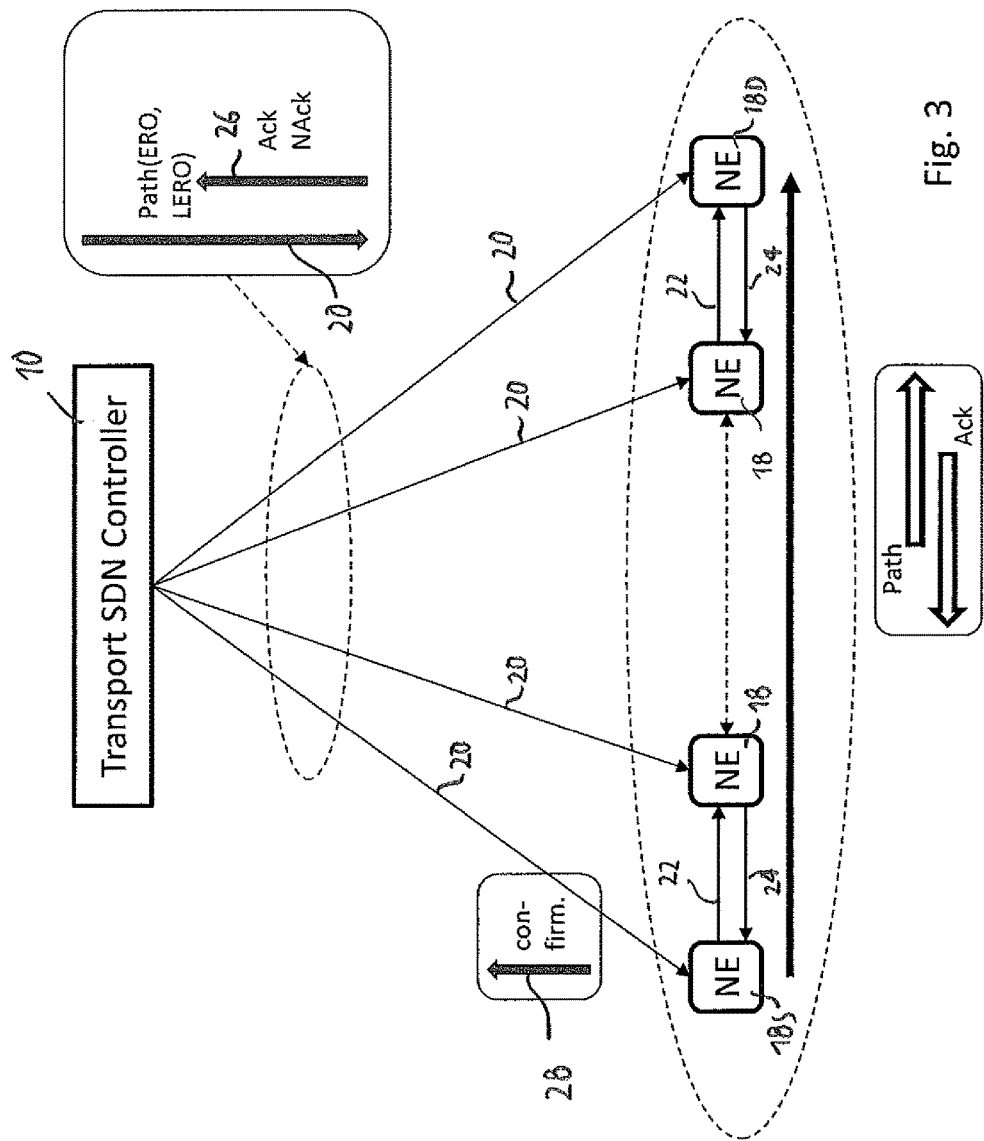
Figure 4:
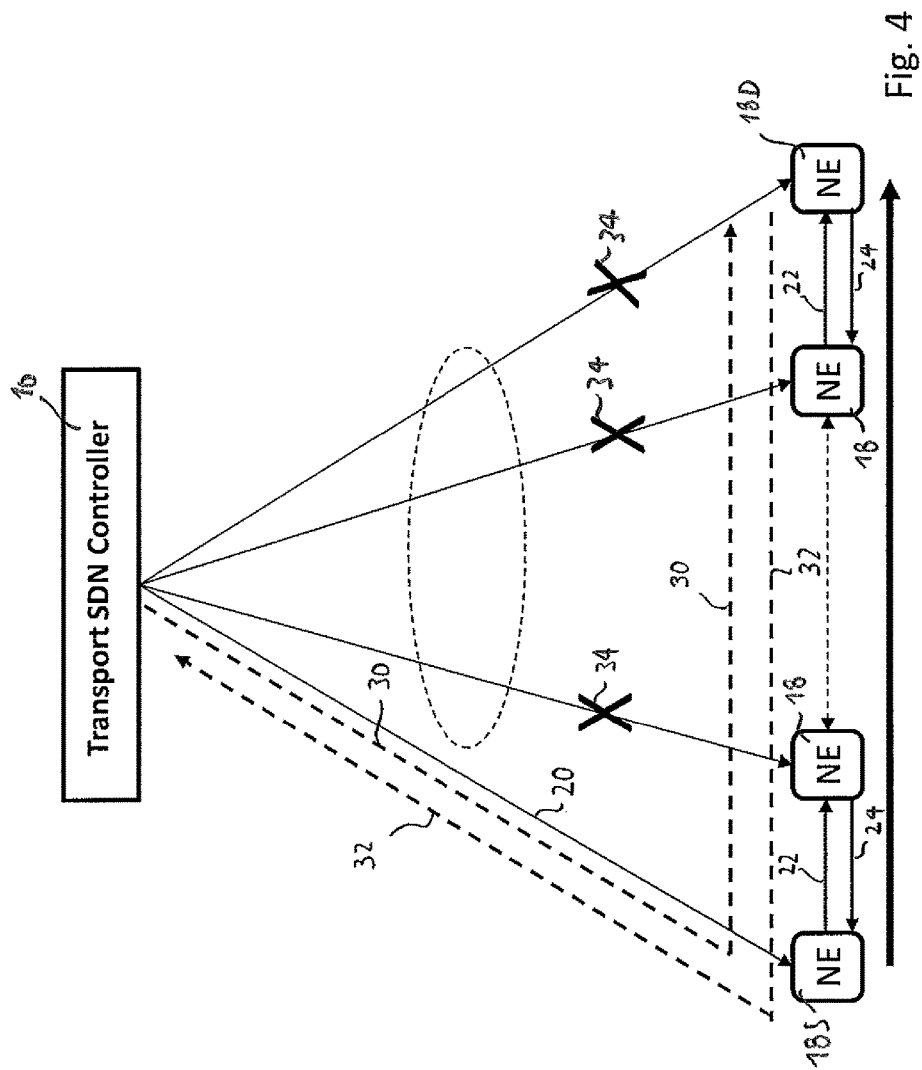
Figure 5:
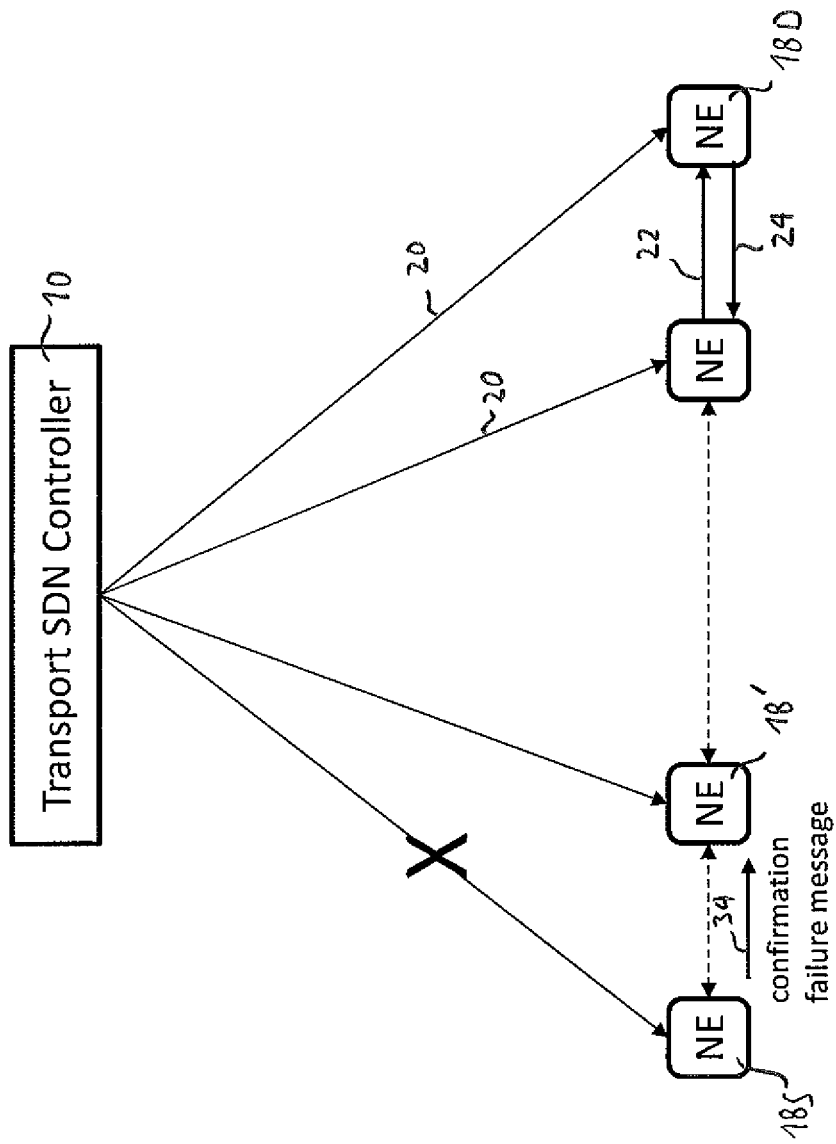
Figure 6:
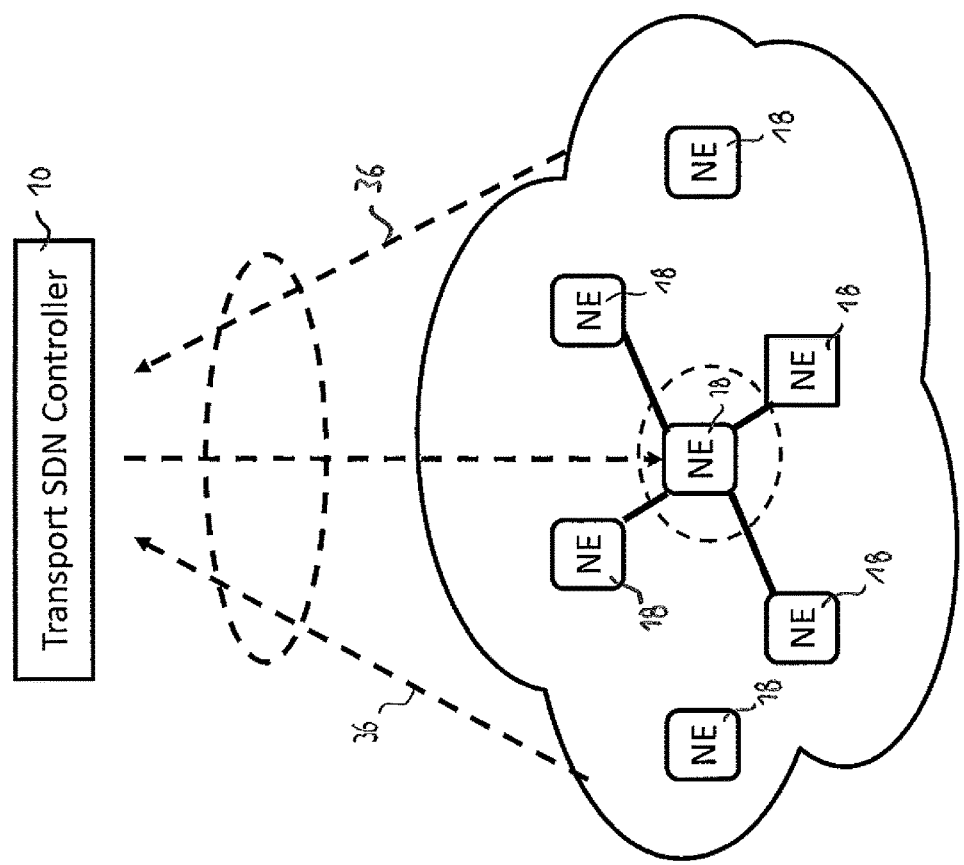

FIG. 1 is a schematic overview of an SDN architecture for a transport network employing the present invention, FIG. 2 is a schematic illustration of a plurality of network elements distributed in a large geographic area and controlled by a central transport SDN controller, FIG. 3 is a schematic illustration of a transport SDN controller and a number of NEs, as well as central control messages and distributed control messages exchanged therebetween, FIG. 4 is a schematic illustration similar to FIG. 3, in which all control channels between the transport SDN controller and the NEs are dysfunctional except for the control channel to the source NE, FIG. 5 is a schematic illustration similar to FIG. 3, in which the control channels between the transport SDN controller and a number of NEs furthest upstream are dysfunctional, and FIG. 6 is a schematic illustration of a plurality of NEs gathering adjacency information and forwarding it to the transport SDN controller.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices and method and such further applications of the principles of the invention as illustrated therein being contemplated therein as would normally occur now or in the future to one skilled in the art to which the invention relates.

FIG. 1 is a schematic overview of an SDN architecture for a transport network employing the present invention. In the architecture of FIG. 1, a central controller 10 is provided, which in the present embodiment is an SDN controller controlling data transport in a transport network, and is hence referred to as a "transport SDN controller". The transport SDN controller 10 communicates via a suitable protocol, such as OpenFlow, with a further SDN controller, which is referred to as end-to-end (E2E) SDN controller 12. The E2E controller 12 communicates source and destination network elements to the transport SDN controller 10, which then in turn controls the establishing of a suitable data path in the transport network. Note that in the present embodiment, a "controller" refers to a computer or a number of interconnected computers that are equipped with a suitable software for carrying out the control. A further software layer 14, referred to as "business applications" layer is provided above the E2E SDN controller 12.

From the E2E SDN controller's 12 view, the transport SDN controller 10 and the underlying transport network is seen like a "single switch" in the sense that the E2E SDN controller 12 simply specifies a source and destination NE, and that the transport SDN controller 10 then establishes the data path in between, just like "closing a switch" between source and destination ports of a switch.

The transport SDN controller 10 is adapted for computing a data path from the source NE to the destination NE along a number of intermediated NEs. The transport SDN controller is a "central controller" in the sense that it resembles a central path computation element (PCE) that computes data paths in a network that may cover a large geographical area, typically extending beyond the size of metro regions and that can actually cover whole countries comprising a plurality of metro regions.

The transport SDN controller 10 has up-to-date information about the network topology, and since it centrally controls the data transport throughout the network, it further has up-to-date information about the traffic throughout the network as well. This way, the transport SDN controller 10 can at each time establish data paths that are consistent with each other and that make optimum use of the available resources.

FIG. 1 further schematically indicates the transport network controlled by the transport SDN controller 10 comprising routers 16 and optical nodes 18, also referred to as "switches" 18 herein, which in the present embodiment establish a dense wavelength division multiplex (DWDM) optical network. As the skilled person will appreciate, a "transport network" is a communication network providing a comparatively high bandwidth with typically little processing on the data being transported and which is long haul, hence covering large geographical distances. In the following, both the optical nodes or switches 18 as well as the routers 16 are referred to as "network elements" (NE). As mentioned above, in the present disclosure an NE can be any kind of switch, including e.g. layer 0 switches such as optical switches and layer 2 switches such as Ethernet switches or the like.

The transport SDN controller 10 contains a multi-layer optimized PCE calculating optimized data paths on multiple-layers, such as packet, optical data unit (ODU) and optical channel (OCh) layers. The transport SDN controller 10 establishes explicit path information, wherein the explicit path information comprises explicit route information and switch set-up information or label selections in the sense explained in the introductory part of the specification. This explicit path information then needs to be communicated to the NEs of the determined path so that each NE can carry out its set-up for data transport. The explicit path information can then be sent via central control messages from the transport SDN controller 10 to each of the NEs 16, 18 constituting the path. This has the advantage that each NE 16, 18, upon receiving the information that it needs for its set-up for data transport along said path can immediately start with its set-up so that the path can be established generally at all NEs 16, 18 simultaneously, rather than consecutively, as is for example the case in ordinary GMPLS schemes.

However, communicating the relevant path information by central control messages between the transport SDN controller 10 and the NEs 16, 18 alone would also have drawbacks which become apparent from the schematic view of FIG. 2.

FIG. 2 schematically shows a plurality of network elements 18 distributed all across the United States. FIG. 2 further shows the transport SDN controller 10 as well as the control paths carrying central control messages between the transport SDN controller 10 and the respective network elements 16, 18 which are symbolized by lines. The precise location of the transport SDN controller 10 is not indicated in FIG. 2. However, it is clear that no matter where it is located, it will necessarily always be separated by a large geographical distance from at least some of the network elements 18. This is the inevitable price one has to pay for providing a central control in a large geographic area. However, the longer the control paths, the higher is the risk that the control path can fail. Accordingly, a centralized control over a large geographical area is much more vulnerable than for example centralized control within a data center or a metro environment.

What is more, unlike the management plane, the SDN control plane must be functioning at all times. Namely, for SDN, a path may need to be dynamically established, released or modified as the demand comes in. Although the data plane and the control plane are separate, the failure of the control path to a data plane node means that the node has failed the SDN functionality. The failure of the controller hence means the total failure of the SDN functionality for the entire network.

In order to provide a high level of fault tolerance to control path failures, in the preferred embodiment of the invention distributed control messages are used in addition to central control messages 20, as will be explained with reference to FIG. 3.

In FIG. 3, a source NE 18S, a destination NE 18D and a number of intermediate NEs 18 according to a path computed by the transport SDN controller 10 are shown. The transport SDN controller 10 sends a central path message 20 to each NE 18, 18S, 18D of the path. Note that the "central path messages" are specific examples of a central control message mentioned before. They are "central" path messages because they are always sent from the central transport SDN controller 10. Each of the central path messages 20 includes the explicit path information, i.e. explicit route information and switch set-up information, for the entire path. In the embodiment shown, the explicit path information is constituted by an Explicit Route Object (ERO) and a Label Explicit Route Object (LERO). Herein, the "labels" have the same meaning as in the GMPLS protocol suite.

Further, according to the shown embodiment, the NEs 18, 18S, 18D exchange distributed control messages 22, 24. Herein, a "distributed control message" is a control message that is exchanged between NEs 18, 18S, 18D of the path. These distributed control messages include distributed path messages 22 which are always sent in downstream direction, i.e. towards the destination NE 18D, and distributed acknowledgement messages 24, which are sent in opposite direction. The distributed path messages 22 also contain the explicit path information of the entire path. The distributed acknowledgement messages 24 indicate that the sending NE 18, as well as all other NEs located downstream thereof have been set-up successfully. Finally, the control also provides for central acknowledgement messages 26 (only shown in the bubble for clarity) sent from each NE 18 to the transport SDN controller 10 if it has been set-up successfully.

In more detail, the distributed control messages 22, 24 are exchanged according to the following scheme: At each NE 18, a path message (central path message 20 or distributed path message 22) will be processed only when it is received for the first time. In other words, if the central path message 20 is received at an NE 18 first, then the central path message 20 will be processed. However, if a distributed path message 22 should be received from the NE 18 adjacent in upstream direction first, then this distributed path message 22 will be processed, and a central path message 20 possibly arriving later will be ignored.

The processing of a path message 20, 22 starts with a validation thereof. Validation herein means checking whether the NE 18 is in fact part of the path, and whether the NE is available for the requested data transport. Since the path has been computed centrally with knowledge of the traffic throughout the network and its current topology, in most cases the NE 18 will, however, be available and have sufficient resources for the requested data transport.

If the validation was positive, then the NE carries out a local set-up according to the Label Explicit Route Object included in the central or distributed path message 20, 22, whichever was received first. Needless to say, the explicit path information in the central and distributed control messages 20, 22 is in any case consistent with each other anyhow. Successful (unsuccessful) set-up is acknowledged (disacknowledged) to the transport SDN controller 10 by a central acknowledgement message 26.

Further, unless the NE is the destination NE 18D, a distributed path message 22 will be sent to the NE 18 adjacent in downstream direction of the path per Explicit Route Object.

Once the destination NE 18D has been set-up successfully, it sends a distributed acknowledgement message 24 in upstream direction. Each NE 18 receiving the distributed acknowledgement message from the NE adjacent in downstream direction of the path forwards this acknowledgement message 24 (or sends an identical or similar acknowledgement message 24) to the adjacent NE 18 in upstream direction, if it has been successfully set-up as well. Accordingly, whenever an NE 18 in the path receives a distributed acknowledgement message 24 from its downstream neighbor, this indicates that all NEs 18, 18D located on its downstream side in the path have been set-up successfully. When the source NE 18S receives the distributed acknowledgement message 24, this hence means that the entire path has been set-up successfully, and this is indicated to the transport SDN controller 10 by a central path confirmation message 28 (only shown in the bubble for clarity). From the central transport SDN controller's 10 point of view, receiving the central path confirmation message 28 has the same meaning as receiving positive central acknowledgement messages 26 from all NEs of the path individually. In the present embodiment, the central path confirmation message 28 is simply the same message as the distributed acknowledgement message 24, i.e. receiving of a distributed acknowledgement message 24 from the source NE 18S will be interpreted by the transport SDN controller 10 as a confirmation for the successful set-up of the entire path.

As is apparent from the above description, the method is indeed extremely fault tolerant with regard to central control path failures. In fact, the transport path can be successfully established even if the control paths between the transport SDN controller 10 and all NEs 18 except for the source NE 18S have failed, as is schematically indicated in FIG. 4. In this case, the explicit path information (ERO, LERO) will be received by the source NE 18S via the central path message 20, and the explicit path information will be communicated via the distributed path messages 22 to all NEs 18, 18D of the path. Then, if all NEs 18, 18S of the path have been set-up successfully according to this explicit path information, this can be acknowledged towards the source NE 18S via the distributed acknowledgement messages 24, and can be confirmed to the transport SDN controller 10 via the central path confirmation message 28. In FIG. 3, the dashed line 30 symbolically represents the flow of explicit path information and the dashed line 32 indicates the flow of acknowledgement information. Dysfunctional control paths are indicated by a "cross-out" symbol 34. In the simpler version of the control scheme described so far, this is hence the worst case scenario that can be handled. Of course, if only one or a few of the control paths should fail, the establishment of the path will be accelerated, because the path can be set-up simultaneously as various NEs.

It may, however, be that the control path between the source NE 18S and the transport SDN controller 10 fails. In this case, and with the version of the method described above, the path cannot be successfully established, because the source NE 18S has no chance to receive the explicit path information via a distributed path message (because the distributed path message is always sent downstream only), and it could not even indicate the successful set-up of the path via a path confirmation message 28 due to the failure in the central control path. This situation is indicated in FIG. 5, where the central control path between the source NE 18S and the transport SDN controller 10 is dysfunctional.

In order to allow for a successful establishment of the data path in such a situation, too, according to a preferred embodiment the above-referenced scheme is extended in that the distributed acknowledgement messages 24 contain the explicit path information, i.e. ERO and LEROs as well. In FIG. 5, reference sign 18' designates the NE the furthest upstream that has a functioning control channel with the transport SDN controller 10. With regard to this NE 18' and all NEs 18, 18D located to the downstream direction thereof, the path set-up occurs as described with reference to FIG. 3 above. Then, when NE 18' receives a distributed acknowledgement message 24 from the NE adjacent in downstream direction, it forwards this distributed acknowledgement message 24 in upstream direction. Since in this embodiment, the distributed acknowledgement message 24 also includes the explicit path information (ERO, LERO), the NEs to the upstream direction of NE 18' may, upon receipt of the distributed acknowledgement message 24, carry out their set-up and successively forward the distributed acknowledgement message 24 further upstream, until it reaches the source NE 18S.

At this instance, the source NE 18S would normally send the path confirmation message 28 to the transport SDN controller 10 which in this case, however, is not possible due to the failure in the control path in between. According to this preferred embodiment, whenever an NE 18 is not able to send the path confirmation message 28 to the transport SDN controller 10 it sends a path confirmation failure message 34 in downstream direction of the path. This procedure is repeated until the path confirmation failure message 34 is received by NE 18' which is the NE furthest upstream that is connected with the transport SDN controller 10 via a functioning central control path. This NE 18' can then send the path confirmation message 28 to the transport SDN controller 10.

The path confirmation failure message 34 need not be an entirely new message, but may simply correspond to a distributed acknowledgement message like the distributed acknowledgement messages 24 described before, with the only difference that it is sent downstream rather than upstream. In other words, whenever an NE 18 receives a distributed acknowledgement message 24 from the NE adjacent in upstream direction, this will be interpreted as a path confirmation failure message 34.

While in the description of the preferred embodiment only the establishment of a path has been explained in detail, it is understood that a similar scheme can be applied for releasing a path. As will be appreciated by the skilled person, for releasing a path, the central SDN controller 10 may send central path release messages to all of the NEs 18 comprising instructions to release the path. In response to receiving such central path release message, each NE 18 may take down the local switching set-up and release the local resource for the path and then send an acknowledgement back to the central SDN controller 10. In addition to this, and in analogy to what was described before with regard to the path establishment, distributed path release messages may be exchanged between NEs 18 of the path which are based on at least one of the central path release messages. This way, NEs that did not receive a central path release message due to a control path failure may receive the path release instructions via distributed path release messages.

While the currently preferred embodiment has been described above, it is understood that this is only exemplary and that many modifications can be made without deviating from the spirit and scope of the invention.

In particular, it is not necessary that the transport SDN controller 10 sends the central path messages to every NE 18, 18S, 18D of the path, but in many practical applications it may be sufficient that it is sent to only a subset of the NEs.

Further, it is not necessary that every central path message 20 or every distributed path message 22 contains the explicit path information for the entire path. From a more general perspective, an improvement over a purely centralized scheme without distributed messaging can be obtained as long as at least some of the central path messages 20 comprise more information than needed by the recipient NE 18 for its set-up for data transport along said path, i.e. information that could be used by another NE 18 for its set-up which may be shut-off from the transport SDN controller 10 due to a central control channel failure.

If the central path messages 20 or distributed path messages 22 do not contain the explicit path information for the entire path, it is nevertheless advantageous if they include the explicit route and switch set-up information of a continuous portion of the explicit path involving plural adjacent NEs. Also, in cases where the distributed acknowledgement messages 24 also contain explicit route information and switch set-up information, it will generally be sufficient that they contain this information for a continuous portion of the path located in the upstream direction of the NE sending the distributed acknowledgement message 24. However, for simplicity in the described embodiment, each central path message 20, distributed path message 22 and distributed acknowledgement message 24 will always contain the path information of the entire path.

In order to be in a position to calculate the paths, the transport SDN controller 10 needs to be aware of the topology information of the entire network under control. For this purpose, according to the present invention the NEs 18 within the network carry out a neighbor discovery of directly or indirectly linked neighbors and forward neighbor adjacency information, indicated by dashed arrows 36 in FIG. 6, to the transport SDN controller 10. This neighbor discovery can be carried out using protocols per se known in the art, such as the link management protocol (LMP) or equivalent means.

The embodiments described above and the accompanying figures merely serve to illustrate the method and devices according to the present invention, and should not be taken to indicate any limitation thereof. The scope of the patent is solely determined by the following claims.

LIST OF REFERENCE SIGNS 10 transport SDN controller 10
12 end-to-end SDN (E2E) controller
16 routers
18, 18S, 18D network elements
20 central path message
22 distributed path message
24 distributed acknowledgement message
26 central acknowledgement message
28 path confirmation message
30 flow of explicit path information
32 flow of acknowledgement information
34 path confirmation failure message
36 forwarding adjacency information

The invention claimed is:

1. A method of establishing a path for data transport in a communication network comprising a plurality of network elements (NEs) and links between said NEs, the path being from a source NE to a destination NE, comprising the following steps:
   computing, at a central controller, a data path from said source NE to said destination NE along a number of intermediate NEs,
   sending, from said central controller, central control messages to at least a plurality of NEs among said source NE, said intermediate NEs and said destination NE, each said central control message including explicit path information, said explicit path information comprising explicit route information and switch set up information, said explicit path information in at least some of the central control messages comprising switch set-up information for at least some of the NEs among the plurality of NEs other than a one of the NEs to which the central control message is sent,
   sending distributed control messages between NEs among said source NE, destination NE and intermediate NEs of said path, said distributed control messages being based on at least one central control message received by one of said NEs,
   said distributed control messages allowing for distributing switch set up information that was lost due to failure in the transfer of a central control message and
   setting up said path based on said switch set-up information; wherein the setup path is used for data transport.

2. The method of claim 1, wherein the NEs of said path exchange said distributed control messages according to a predetermined scheme,
   said scheme ensuring that
      each NE, even without a functioning communication path between the NE and the central controller, receives, from another NE of said path via one of said distributed control messages, a path information relevant for its set-up for data transport along said path, and/or
      one of said NEs of said path determines, whether each NE of said path or of a portion of said path
         has received the explicit path information relevant for setting up said NE for data transport along said path, and/or
         is available for said data transport and/or
         has successfully been set up for data transport along said path.

3. The method of claim 1, wherein said explicit route information and switch set-up information are included in an Explicit Route Object and Label Explicit Route Objects contained in said central control messages or said distributed control messages.

4. The method of claim 1, wherein said central control messages comprise central path messages including said explicit route and said switch set-up information of a continuous portion of the path involving plural adjacent NEs.

5. The method of claim 1, wherein said distributed control messages comprise distributed path messages including said explicit route and said switch set-up information of a continuous portion of the path involving plural adjacent NEs.

6. The method of claim 1, wherein said distributed control messages comprise distributed acknowledgement messages including acknowledgement information indicating one or more of the following:
   whether an NE or a group of said NEs of said path have received the explicit path information relevant for setting up the respective NE or NEs for data transport along said path,
   whether an NE or a group of said NEs of said path is (are) available for the requested data transport,
   whether the NE or said group of said NEs of said path has (have) successfully been set up for data transport along said path.

7. The method of claim 5,
wherein said distributed path messages are sent along a first direction of said path, and
distributed acknowledgement messages are sent along a second direction of said path,
wherein receiving a positive distributed acknowledgement message at an NE from the NE adjacent in the first direction of the path indicates positive acknowledgement information for all NEs in the first direction of said path.

8. The method of claim 5, wherein each NE of said path sends, upon one of
receiving a central path message from said central controller, or
receiving a distributed path message from the NE adjacent in the second direction of said path,
a distributed path message to the NE adjacent in the first direction of said path.

9. The method of claim 5, wherein each NE of said path, upon receiving a central path message or a distributed path message, attempts to set up switching local to the NE as specified by the received central or distributed path message and, if the set up was not successful,
generates a negative central acknowledgement message and sends it to the central controller if the received path message was a central path message received from the central controller and/or
sends a negative distributed acknowledgement message to the NE adjacent in the second direction of said path if the received path message was a distributed path message received from the NE adjacent in the second direction of said path.

10. The method of claim 6, wherein said distributed acknowledgement message includes said explicit route and said switch set-up information of a continuous portion of the path involving plural adjacent NEs.

11. The method of claim 10, wherein
if an NE receives a distributed acknowledgement message including said explicit route and said switch set-up information, and has not received a central path-message or a distributed path message yet, the NE attempts to set up switching local to the NE as specified in the explicit switch set-up information.

12. The method of claim 2, wherein one of said NEs, upon determining that each NE of said path
has received the path information relevant for setting up said NE for data transport along said path, and/or
is available for the requested data transport and/or
has successfully been set up for data transport along said path,
sends a path confirmation message to the central controller.

13. The method of claim 12, wherein the path confirmation message is sent from the NE that is the furthest to a second direction that has contact with the central controller.

14. The method of claim 12, wherein the NE furthest to the second direction, upon receiving a distributed acknowledgement message from the NE adjacent in a first direction, attempts to send said path confirmation message to the central controller.

15. The method of claim 14, wherein in case that the NE furthest to the second direction is not able to communicate the path confirmation message to the central controller, it sends a path confirmation failure message to the NE adjacent in the first direction of the path indicating that it has failed to communicate the path confirmation message to the central controller.

16. The method of claim 15, wherein each NE, upon receiving said confirmation failure message from the NE adjacent in the second direction attempts to send a path confirmation message to the central controller, and, in case that it was not able to communicate the confirmation message to the central controller, sends a path confirmation failure message to the NE adjacent in the first direction of said path.

17. The method of claim 15,
wherein the path confirmation message and/or the path confirmation failure message corresponds to said distributed acknowledgement message.

18. The method of claim 7, wherein said first direction is the downstream direction and the second direction is the upstream direction of said path.

19. The method of claim 1, wherein said method further comprises a step of releasing a path comprising
sending, from said central controller, central path release messages to all or at least a plurality of NEs among said source NE, said intermediate NEs and said destination NE, said central path release messages comprising instructions to release the path, and
sending distributed path release messages between said NEs of said path, said distributed path release messages being based on at least one central path release message received by one of said NEs,
said distributed path release messages allowing for distributing path release information that was lost due to failure in the transfer of a central path release message.

20. The method of claim 1, wherein the network elements carry out a discovery of directly or indirectly linked neighbors, in particular using the link management protocol or equivalent means, and forward neighbor adjacency information to said central controller.

21. The method of claim 1, wherein said central controller carries out a path calculation in a multi-layer architecture comprising IP routing and optical switching.

22. The method of claim 1, wherein said central controller is an software defined networking (SDN) controller managing data flow control in the network.

23. A method for using a network element (NE) in a communication network, the method comprising:
adapting said NE for processing a central path message including explicit path information and for processing distributed path messages including explicit path information, said explicit path information comprising explicit route and switch set-up information of a path, said path having a first direction and a second direction opposite to said first direction,
configuring said NE to send, upon one of
receiving a central path message from a central controller, or
receiving a distributed path message from an NE adjacent in the second direction of said path as specified by said explicit path information, a distributed path message to the NE adjacent in the first direction of said path; and
configuring said NE to determine whether it is the NE that is the furthest to the second direction that has contact with a central controller, and if this is the case, to send, upon determining one or more of that each NE of said path
has received the path information relevant for setting up said NE for data transport along said path,
is available for requesting data transport,
has successfully been set up for data transport along said path,
a path confirmation message to the central controller.

24. The method of claim 23, said NE being configured to attempt, upon receiving a central path message or a distributed path message, to set-up switching local to the NE as specified by the explicit path information included in the received central or distributed path message and, if the set-up was not successful,
- to generate a negative central acknowledgement message and send it to a central controller if the received path message was a central path message received from a central controller and/or
- to send a negative distributed acknowledgement message to the NE adjacent in the second direction of the path as specified in the explicit path information if the received path message was a distributed path message received from the NE adjacent in the second direction of the path.

25. The method of claim 23, wherein said distributed acknowledgement message includes explicit route and switch set-up information of at least a portion of the path as specified by the explicit path information.

26. The method according to claim 25, wherein the NE is further configured to set-up switching local to the NE as specified in the explicit switch set-up information included in a received distributed acknowledgement message if it has not received a central path message or a distributed path message yet.

* * * * *